United States Patent [19]
Bellefeuille

[11] Patent Number: 5,936,398
[45] Date of Patent: Aug. 10, 1999

[54] MEASURING ROLLER SYSTEM WITH SENSOR ERROR CORRECTION

[75] Inventor: Alain Bellefeuille, Drummondville, Canada

[73] Assignee: Denharco Inc., St. Hyacinthe, Canada

[21] Appl. No.: 08/807,777

[22] Filed: Feb. 28, 1997

[51] Int. Cl.⁶ .............................. G01B 7/04; G01B 7/14; G01B 3/12
[52] U.S. Cl. ................. 324/206; 324/207.11; 33/778
[58] Field of Search ................ 324/206, 207.24, 324/207.12, 225, 262; 33/772, 773, 774, 778

[56] References Cited

U.S. PATENT DOCUMENTS 4,577,411  3/1986  Martin ........................... 33/779

Primary Examiner—Walter E. Snow

[57] ABSTRACT

A measuring roller system for a tree processing machine having a measuring roller and roller mounting means for mounting the roller on the frame of the machine for swinging movement toward or away from the frame. The roller is rotatably mounted on the roller mounting means for rotation caused by axial movement of a tree past the roller while in contact with the roller and while being processed by the machine. A sensor is positioned to measure the amount of rotation of the roller to provide a measure of length of tree fed axially past the roller. The roller system has sensor moving means to rotate the sensor in unison with the roller when the roller is rotated by transaxial movement of the tree during axial movement.

9 Claims, 4 Drawing Sheets

MEASURING ROLLER SYSTEM WITH SENSOR ERROR CORRECTION

BACKGROUND OF THE INVENTION

1. Field of the Invention

This invention is directed toward an improved measuring roller system. The invention is more particularly directed toward an improved measuring roller system used in tree processing machines for measuring a length of tree processed by the machine.

2. Description of the Related Art Including Information Disclosed Under CFR §§1.97–1.99

Measuring roller systems are presently employed on tree processing machines to measure the length of a least a section of the tree being processed by the machine. The systems include a measuring roller which is usually toothed to bite into the tree to minimize slippage. A sensor arrangement measures the amount of rotation of the roller as it is rotated by a tree being fed past the roller by the machine, and this amount of rotation is converted to provide a measure of length of the tree fed past the roller.

A tree being processed, such as when it is being delimbed, is held by gripping arms on the machine and feed rollers feed the tree through the gripping arms to delimb it. The measuring roller is usually mounted at the ends of swinging arms on the machine and is biased against the tree as the tree is fed by the feed rollers past the measuring roller. Problems arise when the tree being fed changes position to move toward or away from the measuring roller simultaneously with being fed in an axial direction past the roller. This position change occurs because the tree is not always symmetrical and the gripping arms can change the position of the tree as they regrip the tree due to changes in the cross-section of the tree as it is being fed axially. The position change of the tree can cause inaccurate measuring of the length of the tree. The inaccurate measurement occurs because as the tree moves in a transaxial direction relative to the roller, it causes the roller to swing relative to the frame of the machine. As the roller swings, it also rotates slightly in one direction or the other. This rotation is incorrectly picked up by the stationary sensor arrangement as axial movement of the tree when in fact the rotation is due to transaxial movement.

SUMMARY OF THE INVENTION

It is the purpose of the present invention to provide a measuring roller system that minimizes errors in length measurement due to swinging of the roller caused by transaxial movement of the tree. In accordance with the present invention, a measuring roller system is provided having correcting means for taking into account the rotation of the roller caused by transaxial movement of the tree. The correcting means in the measuring roller system comprise sensor moving means to automatically rotate the sensor the same amount as the roller rotates during transaxial movement of the roller so that there is no relative movement between the roller and the sensor during transaxial movement that could be incorrectly translated into a length measurement.

The invention is particularly directed toward a measuring roller system having a measuring roller and roller mounting means for mounting the roller on a frame for swinging movement toward or away from the frame, the roller also rotatably mounted on the roller mounting means. The system includes a sensor positioned to measure the amount of rotation of the roller as an elongated object is fed axially past the roller in contact with it causing it to rotate. The system further includes error correcting means to take into account error introduced by rotation of the roller due to any transaxial movement of the object during axial movement.

The invention is further particularly directed toward a measuring roller system for a tree processing machine having a measuring roller and roller mounting means for mounting a roller on a frame of the machine for swinging movement toward or away from the frame. The roller is also rotatably mounted on the roller mounting means for rotation caused by axial movement of a tree past the roller while in contact with the roller and while being processed by the machine. A sensor is positioned on the roller mounting means to measure the amount of rotation of the roller to provide a measure of the length of tree fed axially past the roller. Sensor moving means are provided to rotate the sensor in unison with the roller when the roller is rotated by transaxial movement of the tree during axial movement.

DESCRIPTION OF THE PREFERRED EMBODIMENTS

Figure 1:
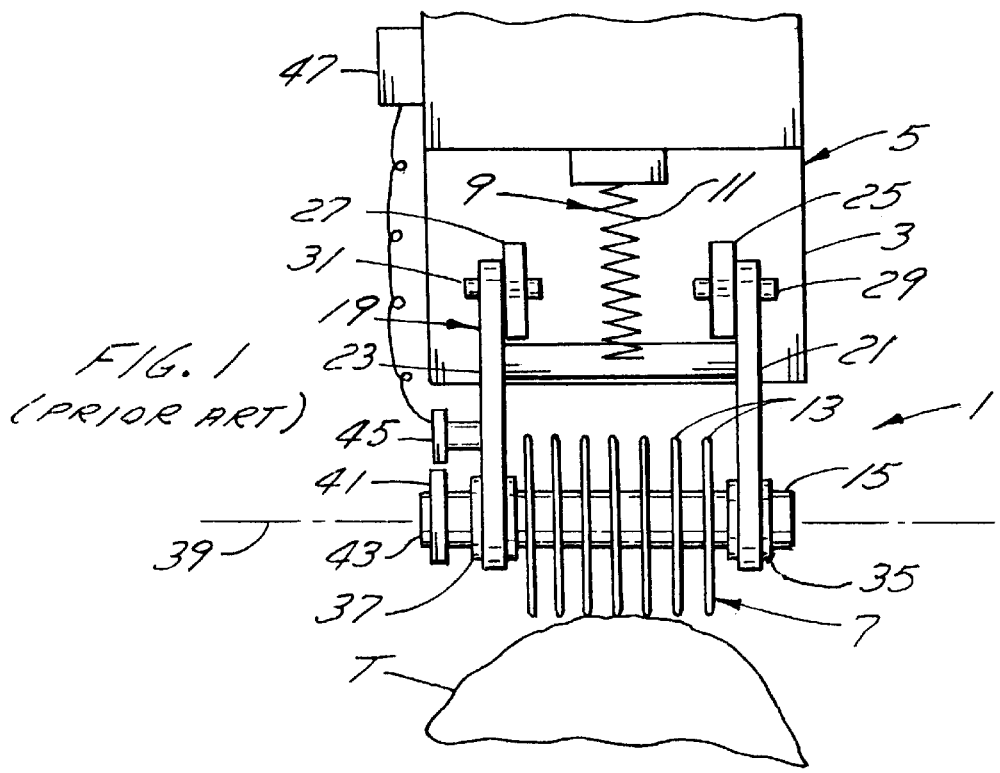
FIG. 1 is a front view of the a prior art measuring roller system.
Figure 2:
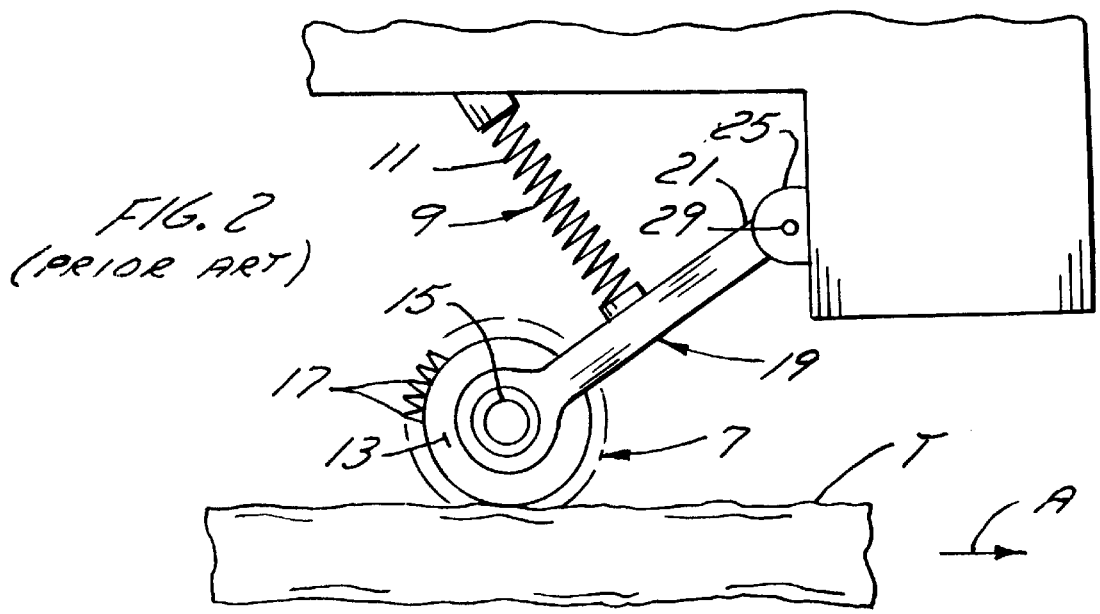
FIG. 2 is a right side view of the prior art system.
Figure 3:
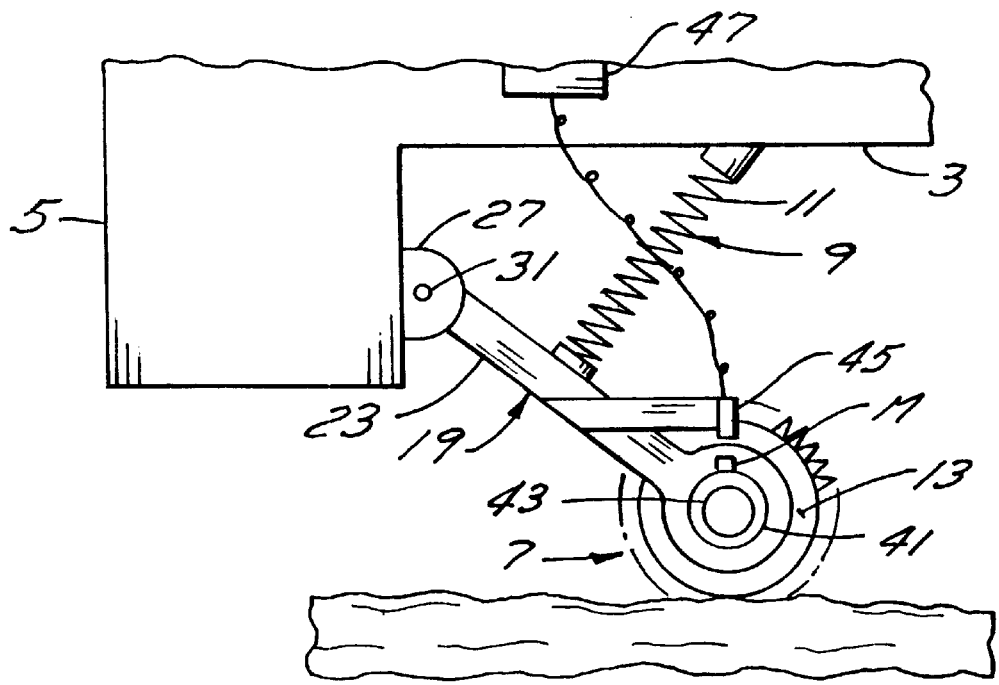
FIG. 3 is a left side view of the prior art system.

The measuring roller system 1 is normally mounted on the X; frame 3 of a tree processing machine 5, such as a delimber, as shown in FIGS. 1 to 3. The system 1 is mounted on the frame 3 in a position to have the measuring roller 7 of the system located in the axial path of travel, shown by the arrow A, of a tree T being delimbed by the machine 5. Biasing means 9, such as spring means 11, bias the roller 7 against the tree T as it is being fed by the delimbing machine past the roller.

The measuring roller 7 of the system 1 can be of any well known type and can, for example, comprise a plurality of equal-sized, circular disks 13, fixedly mounted concentrically, in spaced-apart relation on a shaft 15. Each disk 13 has circumferentially spaced-apart, radial teeth 17 on its peripheral edge.

Roller mounting means 19 are provided for mounting the roller 7 on the machine frame 3. The roller mounting means 19 comprise a pair of arms 21, 23 pivotally mounted at one end to brackets 25, 27 on the frame 3 of the machine 5. Pivot pins 29, 31 pivotably mount the arms 21, 23 to the brackets 25, 27 respectively. The pivot pins 29, 31 can be bolts by way of example. The roller 7 is rotatably mounted on the free ends of the arms 21, 23. More particularly, the shaft 15 of the roller 7 is mounted, on each side of the disks 13, on the ends of the arms 21, 23 by bearings 35, 37. The roller mounting means 19 allows the roller 7 to swing toward or away from the frame 3 while rotating in the arms 21, 23.

The roller mounting means 19 mounts the roller 7 in the axial path of travel of the tree T being processed, with the axis 39 of the roller shaft 15 transverse to this path of travel of the tree shown by the arrow A. The biasing means 9 is located between the arms 21, 23 and the frame 3 to bias the roller 7 against the tree T with sufficient force to have the teeth 17 on the roller disks 13 bite into the tree T thus causing the roller to rotate as the tree is fed past.

Means are provided for measuring the amount of rotation of the roller 7 as it is rotated by the tree T feeding past it, to provide a measure of the length of the tree. The rotation measuring means includes a circumferential, magnetic, scale 41 on an extension 43 of the shaft 15 past one of the bearings 35. A magnetic sensor 45 is normally mounted on the arms 21, 23 adjacent the scale 43 and radially to the axis of the shaft 15. As the roller 7 is rotated by the tree, the scale 41 moves past the sensor 45, and the sensor provides an indication of the amount of rotation of the roller 7. This is translated by a processor 47, connected to the output of the sensor, into a measure of length of tree fed past the roller 7.

Figure 4:
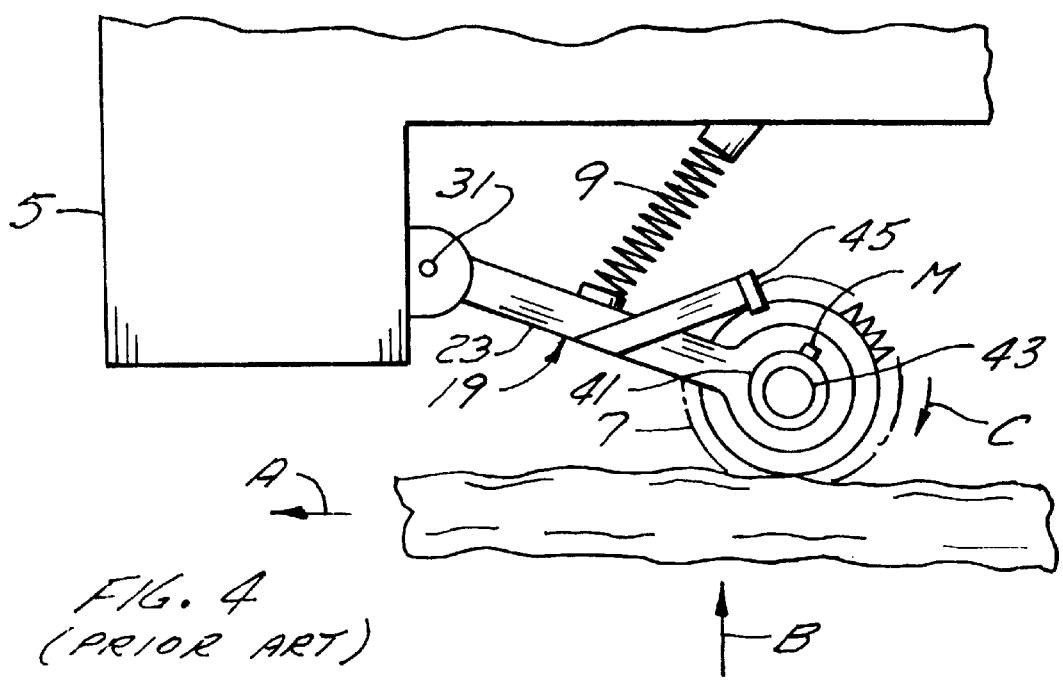
FIG. 4 is a left side view of the system showing rotation of the roller caused by transaxial movement of the object being measured.

The measuring arrangement described thus far is well known. The scale and sensor arrangement could be optical, by way of example, instead of magnetic. However, this known measuring arrangement presents problems when the tree T moves transaxially as shown by the arrow B in FIG. 4, while still being fed axially in the direction of arrow A. When the tree moves in the direction of arrow B, the roller 7 is swung upwardly about pivot pins 29, 31. As the roller 7 swings upwardly it also rotates slightly in the direction of the arrow C due to the fixed length of the arms 21, 23. This rotation, caused by the transaxial movement of the tree instead of its axial movement, moves a mark M on the scale 41 past the sensor 45 to give a false reading of the length of tree fed past the roller.

Figure 5:
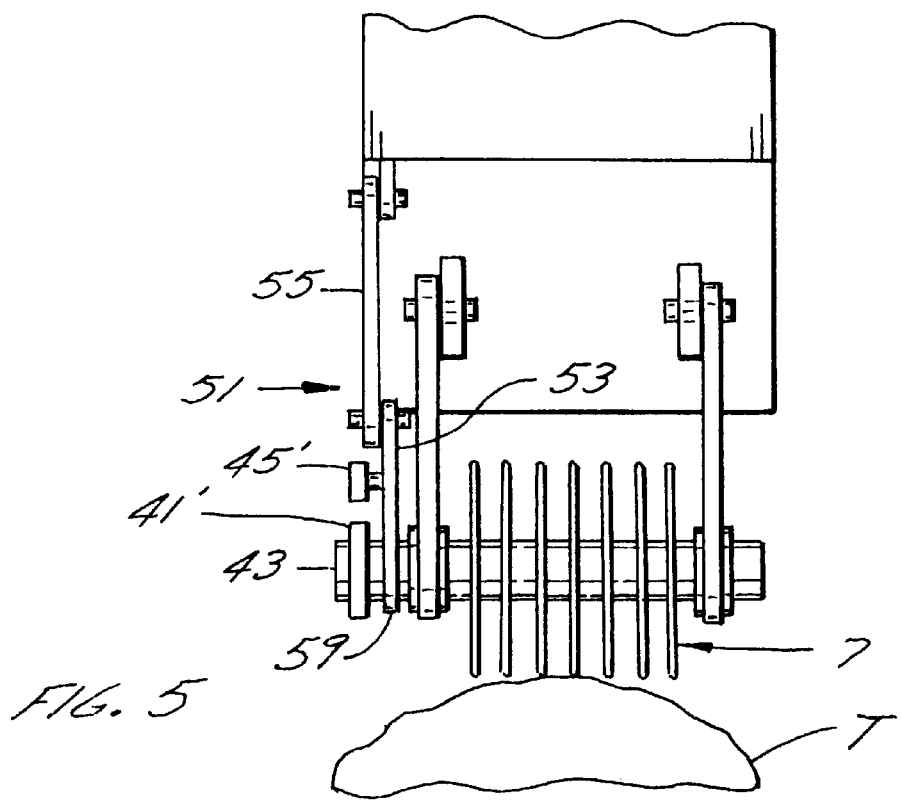
FIG. 5 is a view similar to FIG. 1 showing the improved measuring roller system.
Figure 6:
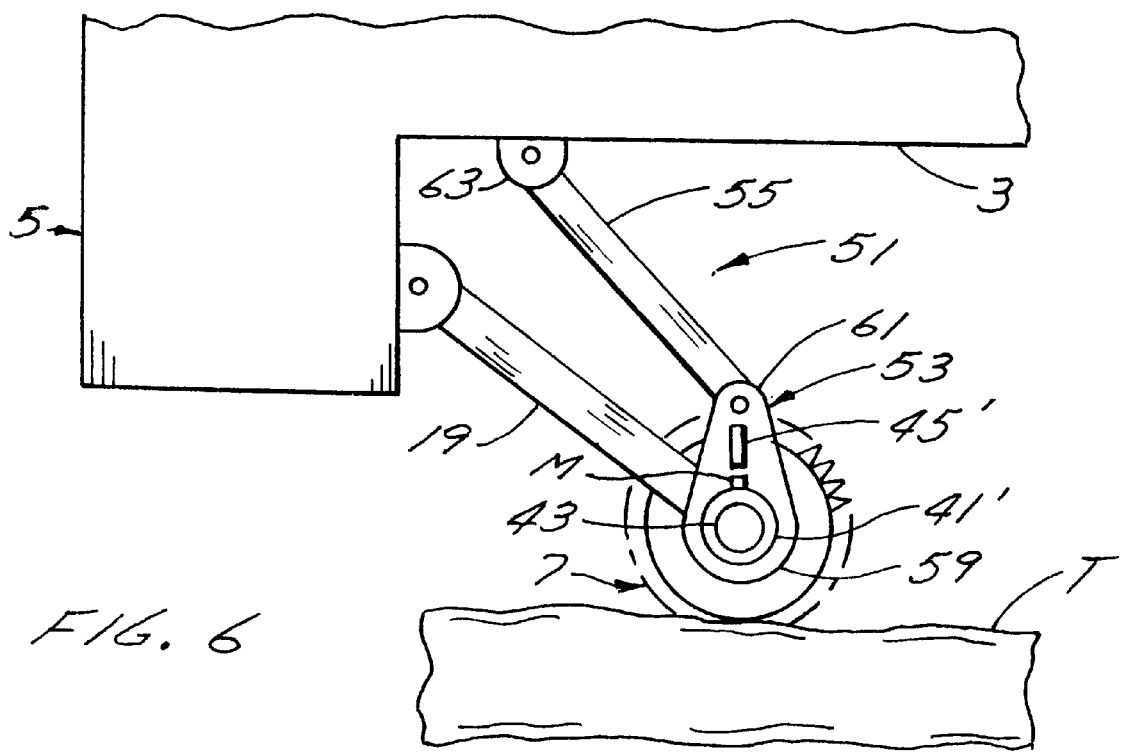
FIG. 6 is a left side view of the system shown in FIG. 5.
Figure 7:
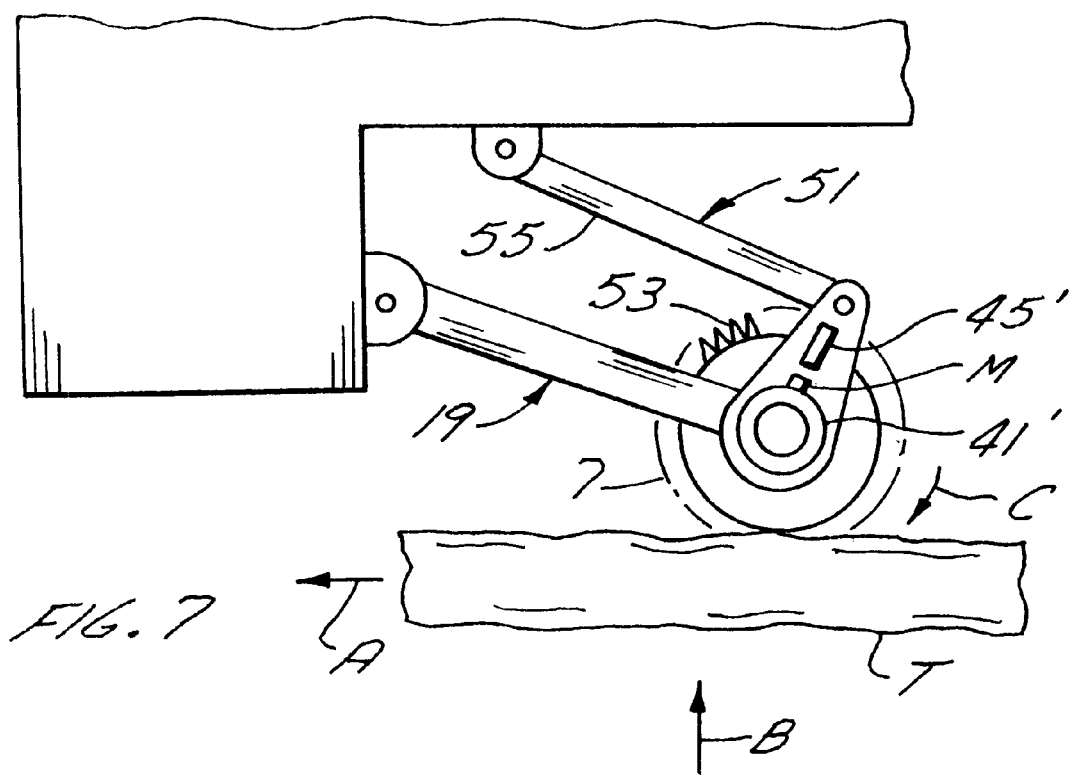
FIG. 7 is a view similar to FIG. 4 with the improved system.

In accordance with the present invention, as shown in FIGS. 5 and 6, sensor moving means 51 are provided for moving the sensor in unison with rotation of the roller 7 due to swinging movement of the roller. The sensor moving means 51 can comprise a link system having an elongated bracket 53 and a link 55. The bracket 53 is rotatably mounted, via bearings 57 on one end 59 on the shaft extension 43. The other end 61 of the bracket 53 is pivotably attached to one end of the link 55. The other end of the link 55 is pivotably attached to the frame 3 of the machine by a bracket 63. The link 55 can be adjustable in length. The sensor 45' is mounted on the bracket 53, adjacent the scale 41' on the shaft extension 43 and radial to the axis 39 of the shaft 15. Now, if the roller 7 is moved upwardly, and the mark M moves, as shown in FIG. 7, the link arrangement rotates the sensor 45' the same amount as the roller rotates to keep the sensor 45' aligned with the mark M so that no rotation of the roller is measured due to transaxial movement of the roller. Other types of sensor moving means can be employed.

I claim:

1. A measuring roller system having:
    a measuring roller:
    roller mounting means for mounting the roller on a frame for swinging movement toward or away from the frame, the roller rotatably mounted on the roller mounting means;
    a sensor positioned to measure the amount of rotation of the roller as an elongated object is fed axially past the roller in contact with it causing it to rotate;
    the sensor mounted for rotation relative to the mounting means;
    and sensor moving means for rotating the sensor relative to the mounting means in unison with the roller when the roller is moved toward or away from the frame and rotated by transaxial movement of the object during axial movement.

2. A measuring roller system as claimed in claim 1 wherein the roller has a shaft by means of which it is rotatably mounted on the roller mounting means, the sensor rotatably mounted on the shaft.

3. A measuring roller system as claimed in claim 2 including a bracket rotatably mounted on the shaft and carrying the sensor in a position where it is radially aligned with the axis of rotation of the shaft.

4. A measuring roller system as claimed in claim 1 wherein the sensor moving means includes a link pivotably joining the sensor to the frame, movement of the roller mounting means causing the link to rotate the sensor in unison with rotation of the roller due to transaxial movement.

5. a measuring roller system as claimed in claim 4 wherein the link is adjustable in length.

6. A measuring roller system as claimed in claim 3 wherein the sensor moving means includes a link pivotably joining the bracket to the frame, movement of the roller mounting means causing the link to rotate the bracket, and thus the sensor, in unison with rotation of the roller due to transaxial movement.

7. a measuring roller system as claimed in claim 6 wherein the link is adjustable in length.

8. A measuring roller system for a tree processing machine having;
    a measuring roller, the roller including a shaft;
    roller mounting means for mounting the roller, by its shaft, on a frame of the machine for swinging movement toward or away from the frame, the roller rotatably mounted on the roller mounting means for rotation caused by axial movement of a tree past the roller while in contact with the roller and whole being processed by the machine;
    a sensor positioned to measure the amount of rotation of the roller to provide a measure of the length of tree fed axially past the roller;
    and sensor moving means to rotate the sensor in unison with the roller when the roller is rotated by transaxial movement of the tree during axial movement, the sensor moving means including a bracket rotatably mounted on the shaft and carrying the sensor radially aligned with the axis of rotation of the shaft, and a link pivotably joining the bracket to the frame, movement of the roller mounting means causing the link to rotate the bracket, and thus the sensor, in unison with rotation of the roller due to transaxial movement.

9. A measuring roller system as claimed in claim 8 wherein the link is adjustable in length.

* * * * *